Patented Aug. 3, 1943

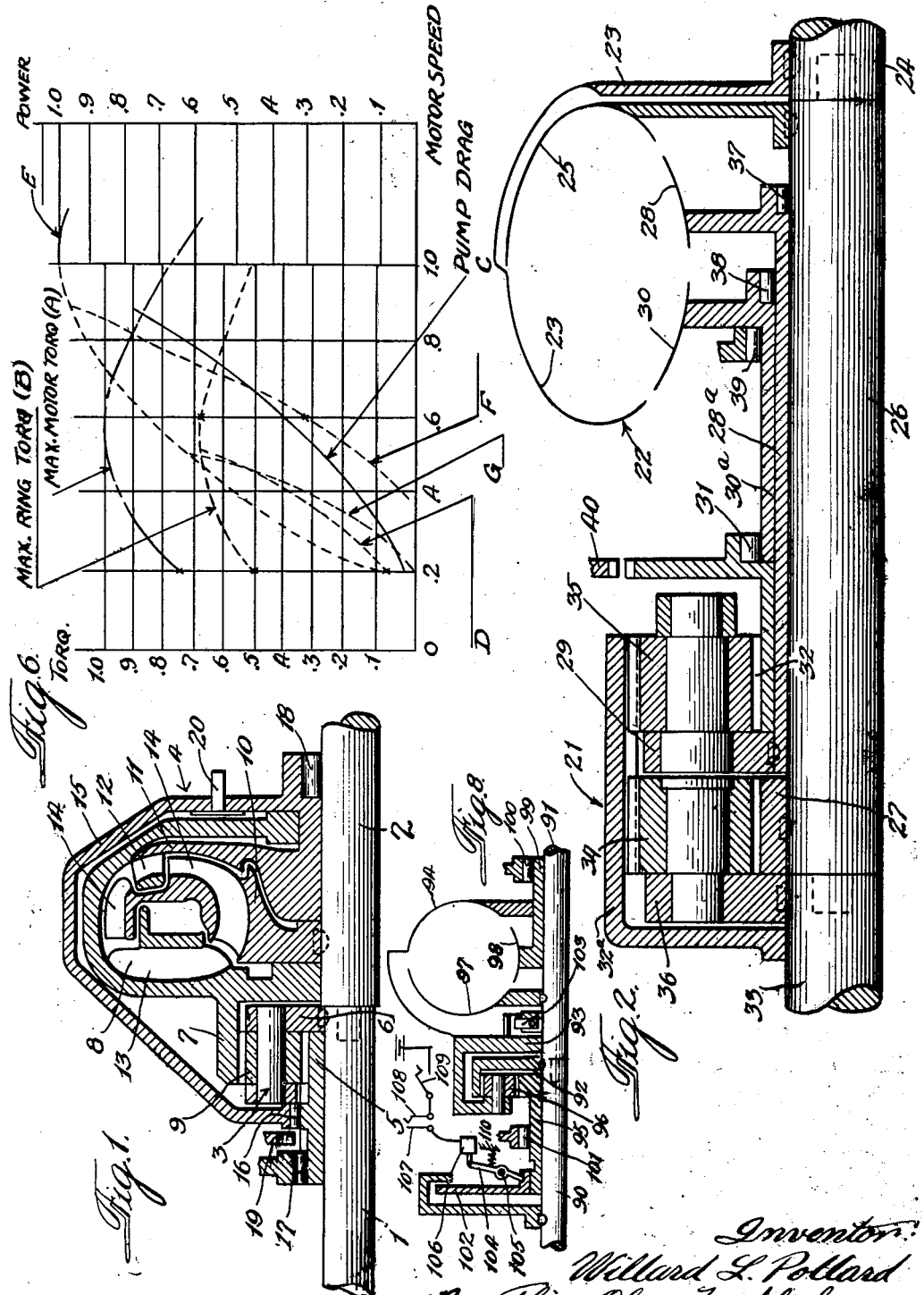

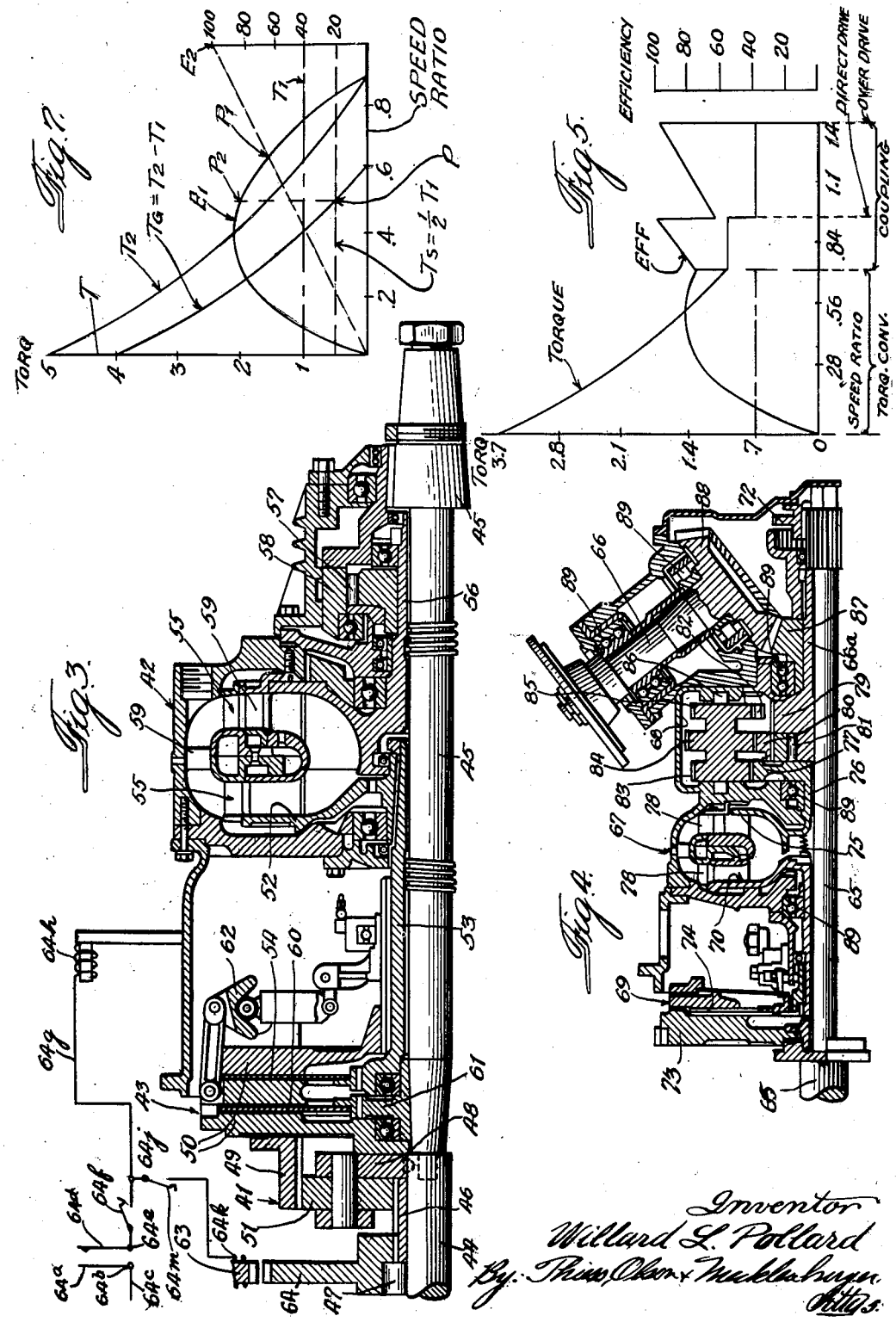

2,325,876

UNITED STATES PATENT OFFICE 2,325,876

TRANSMISSION

Willard L. Pollard, Evanston, Ill.

Application April 18, 1940, Serial No. 330,337

5 Claims. (Cl. 74—189.5)

My invention relates to variable speed transmissions.

One of the objects of my invention is to provide an improved transmission including a hydraulic torque converter which will operate on a high efficiency part of the hydraulic torque converter curve.

A further object is to provide a hydraulic torque converter which will have a quick pick-up of the pump drag.

A further object is to provide a transmission which will bring into play maximum motor torque at a relatively low motor speed.

Further objects and advantages of the invention will be apparent from the description and claims.

In the drawings, in which my invention is illustrated,

Figure 1 is an axial sectional view of a transmission;

Fig. 2 is an axial sectional view showing another form;

Fig. 3 is an axial sectional view showing another form;

Fig. 4 is an axial sectional view showing another form;

Fig. 5 is a diagrammatic view showing various curves relating to the transmission;

Fig. 6 is another diagrammatic view showing curves relating to the transmission;

Fig. 7 is a diagrammatic view showing other curves relating to the transmission; and Fig. 8 is an axial sectional view showing another form of transmission.

Referring first to Fig. 1, the construction shown comprises a drive shaft 1, a driven shaft 2 coaxial therewith, and a planetary transmission 3 and hydraulic torque converter transmission 4 in series between the drive shaft and driven shaft. The planetary transmission comprises a sun gear 5, a gear carrier 6 secured to the drive shaft 1, a ring gear 7 secured to the pump rotor 8 of the torque converter 4 and planet gearing 9 carried by the gear carrier 6 and meshing with the sun gear 5 and ring gear 7.

The hydraulic torque converter comprises the pump rotor 8 free to rotate on the driven shaft 2, the turbine rotor 10 secured to the driven shaft 2, and a reactance roto-stator or one-way stator 11 having guide vanes 12 cooperating with the vanes 13 on the pump rotor and with the vanes 14 on the turbine rotor 10. The one-way stator 11 is secured to a torque-transmitting casing 15 which has a one-way clutch connection 16 with the sun gear 5 which prevents the sun gear 5 from overrunning the one-way stator 11. A one-way anchorage device 17 is provided to prevent reverse rotation of the sun gear 5. A one-way clutch 18 is provided to prevent the one-way stator 11 from overrunning the driven shaft 2. A manually controllable latch 19, which may be a solenoid latch, is provided for holding the sun gear 5 against rotation when desired. A suitably-controlled clutch 20 is provided for connecting the pump rotor 8 with the torque-transmitting housing 15 of the one-way stator 11 when desired.

In operation the drive shaft 1 may be connected with the crank shaft of an internal combustion motor and the driven shaft 2 may be connected with the propeller shaft of an automobile. Any suitable reverse mechanism may be provided.

For the lower speeds, the latch 19 is placed in position so as not to engage the sun gear. During the first stage of pick-up, the reverse reaction on the one-way stator 11 will more than counterbalance the forward pressure of the planet gearing 9 on the sun gear 5. This will cause an overdrive of the ring gear 7 and a consequent high speed drive of the pump rotor 13. The torque of the pump rotor 8 will be transmitted through the one-way stator 11 to the turbine rotor 10 on the propeller shaft 2. As the torque ratio between the turbine rotor 10 and the pump rotor 8 becomes less, the reverse reaction on the one-way stator 11 will become less and will finally become less than the forward torque on the sun gear 5, at which time the sun gear will free itself from the one-way anchor 17, and the one-way reactance stator 11 will begin to float until it catches up with the driven shaft 2, at which time the one-way clutch 18 will engage the driven shaft 2 and the fluid torque converter will become a fluid coupling, the torque converter action then being eliminated.

If an overdrive is desired after the transmission has gotten up practically to direct drive, the motor may be slowed down slightly and the latch 19 applied to the sun gear 5 to hold it against rotation. Thereafter, the drive will be in effect an overdrive, the torque converter continuing to act as a fluid coupling with the torque-converting action eliminated. If it is desired to eliminate the fluid coupling action, the clutch 20 may be applied to connect the torque-transmitting housing 15 with the pump rotor 8. As the one-way clutch 18 prevents the stator 11 from overrunning the driven shaft 2, the fluid coupling is thus eliminated entirely.

Fig. 2 shows a transmission which might be suitable for truck drive or where extremely low gear is required. The construction shown comprises a compound planetary gear construction 21 and a compound fluid torque converter construction 22 in series. The torque converter 22 has the pump rotor 23 connected with the motor shaft 24 and has a primary turbine 25 connected through the intermediate shaft 26 to one of the sun gears 27, a secondary stato-rotor turbine 28 connected through the hollow shaft 28a with one of the cages 29 and a stato-rotor reactance 30 connected through the tubular shaft 30a and a free-wheeling clutch 31 with the other sun gear 32.

The ring gear 32a rotates freely on the driven propeller shaft 33 and has a duplex internal gear arrangement meshing with both sets of planet gearing 34 and 35. The propeller shaft 33 is connected to the cage 36. Suitable one-way anchorage devices 37, 38, 31 and 39 are provided to prevent the secondary stato-rotor turbine 28 from overrunning the primary turbine 25, to prevent the stato-rotor reactance member 30 from overrunning the secondary stato-rotor turbine, to prevent the front sun gear 32 from overrunning the stato-rotor reactance member 30, and to prevent reverse rotation of the stato-rotor reactance member 30. A suitable solenoid brake member 40 may be provided for holding the front sun gear 32 against rotation for overdrive. In this form, in picking up, the rear sun gear will rotate first, the ring gear 32a remaining stationary giving a very low drive. Thereafter, as the primary turbine 25 picks up in speed and begins to lose efficiency, the secondary stato-rotor turbine 28 takes hold to start the front cage 29 rotating. Thereafter, as the secondary stato-rotor turbine 28 picks up in speed and the reaction on the stato-rotor reactance 30 decreases, the sun gear 32 will start the stato-rotor reactance 30 rotating and the hydraulic unit will then act as a fluid coupling. Thereafter, an overdrive may be obtained by holding the front sun gear 32 against rotation by means of the brake member 40.

The construction shown in Fig. 3 is one which may be suitable for rail car drive. It comprises a planetary gear construction 41 and a hydraulic torque converter 42 in series with the planetary gear construction in front of the hydraulic torque converter. A suitable two-way clutch construction 43 is provided by means of which in one condition of the clutch the planetary gear drive and the hydraulic torque converter gear are connected in series between the drive shaft 44 and the driven shaft 45 and by which, in another condition, the overdrive action of the planetary gear construction and the torque converter action of the hydraulic torque converter are eliminated, the drive then being in effect a direct fluid coupling drive. Under still other conditions, for overdrive without torque converter action, the sun gear may be held against rotation, the drive then being through the overdrive planetary, the action of the fluid torque converter being entirely eliminated both as to torque conversion and coupling.

The planetary gear construction shown comprises a sun gear 46 having a one-way clutch connection 47 to prevent it from overrunning the drive shaft 44, a gear carrier 48 secured to the drive shaft 44, a ring gear 49 secured to the driving member 50 of the two-way clutch 43, and a planetary gear 51 carried by the gear carrier 48 and meshing with the sun gear 46 and ring gear 49.

The hydraulic torque converter comprises a pump rotor 52 secured to a tubular shaft 53 on which is mounted one of the driven disc members 54 of the two-way clutch 43, a turbine rotor 55 mounted on a tubular shaft 56 surrounding the driven shaft 45, and having a one-way clutch connection 57 with the clutch ring 58 secured to the driven shaft, to enable the turbine 55 to drive the driven shaft, and a fixed stator 59 secured to the fixed casing, which stator cooperates with the pump rotor 52 and turbine rotor 55 to effect torque increase.

The other driven disc member 60 of the two-way clutch is mounted on a collar 61 secured to the driven shaft 45. Suitable operating means 62 are provided by means of which the driving clutch member may be connected alternatively with either of the two driven clutch discs.

In starting, the latch member 63 is placed in position to engage the clutch member 64 to hold the sun gear 46 against rotation. The two-way clutch 43 is placed in position to connect the pump rotor 52 to rotate with the driving member 50 of the clutch. The pump rotor will therefore be driven at an overdrive speed corresponding to the speed of the ring gear 49. The turbine rotor 55 will be driven from the pump rotor 52 through the stator 59 with an increase of torque. The turbine rotor 55 will transmit power to the driven shaft 45 through the sleeve 56 and one-way clutch 57.

When the angular speed of the driven shaft 45 has been brought up approximately to the angular speed of the drive shaft 44, the clutch control 62 and latch 63 are operated substantially simultaneously to release the sun gear 46 and to disconnect the pump rotor 52 from the driving clutch member 43 and connect the driven shaft 45 directly with the driving clutch member 43 through the clutch disc 60. The transmission will at once go into direct drive as soon as the sun gear 46 catches up in speed with the drive shaft 44, at which time the one-way clutch 47 will effect engagement between the sun gear 46 and the drive shaft 44 to prevent the sun gear from overrunning. The hydraulic torque converter will come to a standstill, the shaft 45 being enabled to run ahead of the turbine rotor 55 by the one-way clutch 57.

For overdrive, the two-way clutch 43 is maintained in position to connect the driven shaft 45 with the driving clutch member 50, the motor is slowed down somewhat to bring the sun gear 46 substantially to a standstill and the latch 63 is operated to hold the sun gear against rotation. Thereafter, a mechanical overdrive will be effected between the drive shaft 44 and the driven shaft 45 through the ring gear 49 and clutch disc 60.

In order to effect the simultaneous release of the sun gear 46 and the change in connections of the two-way clutch 43 apparatus for this purpose is provided controlled by the relative speed of the drive shaft 44 and the driven shaft 45. This apparatus comprises a speedometer pointer 64a shiftable back and forth about the center 64b and electrically connected with the conductor 64c, a speedometer pointer 64d oscillatable back and forth about the center 64e and movable into and out of engagement with the speedometer needle 64a for making an electrical connection therewith, and a manually operable switch 64f for breaking the electrical connection when desired, the switch 64f being in series with the circuit breaker 64g and 64d. The circuit leads from the switch 64f through a conductor 64g to a solenoid 64h which controls the shifting of the two-way clutch and is also connected through a conductor 64j with a solenoid 64k which controls the operation of the sun gear latch 63. For effecting overdrive a manually controllable switch 64m is provided which controls the circuit for the solenoid 64k.

The position of the speedometer pointer 64a is controlled by the speed of the drive shaft 44 and the position of the speedometer pointer 64d is controlled by the speed of the driven shaft 45. These speedometers are so designed and calibrated that the pointer 64d will make electrical contact with the needle 64a when the speed of the driven shaft 45 attains a predetermined speed ratio with respect to the speed of the drive shaft 44. Thus if it is desired that the shift from torque converter and planetary action to nontorque converter and nonplanetary action shall take place under a condition in which the speed of the driven shaft 45 has reached 80 percent of the speed of the drive shaft 44, the speedometers will be so designed that contact will be made when this condition is attained. When this contact is made, circuits are established which energize the solenoids 64h and 64k to effect the desired shift. When it is desired to shift back to converter and planetary action, the manual switch 64f is opened to deenergize the solenoids 64h and 64k. For overdrive the switch 64m is opened to enable the latch 63 to hold the sun gear 46 against rotation.

The construction shown in Fig. 4 may be suitable for bus drive. It comprises a drive shaft 65, a driven shaft 66 extending at an angle with respect to the drive shaft, a hydraulic torque converter 67 and sliding gear transmission 68 connectible in series between the drive shaft and the driven shaft, a clutch 69 for connecting and disconnecting the pump rotor 70 with respect to the driving clutch member 71, and a clutch 72 for connecting and disconnecting the drive shaft 65 with respect to the driven member 66a of the sliding gear transmission.

The torque converter comprises the pump rotor 70 connectible and disconnectible with respect to the driving clutch member 73 by means of the driven clutch disc 74, the turbine rotor 75 secured to a tubular shaft 76 on which the driving gear 77 of the sliding gear transmission is mounted, and a fixed vaned reactance stator 78 acting in the usual manner between the pump rotor 70 and the turbine rotor 75. The sliding gear transmission comprises the driving gear 77 on the tubular shaft 76, the driven gear 79 on the tubular shaft 66a, the sliding gear 80 shiftable from the position in which it has a freewheeling connection 81 with the driven member 79 of the sliding gear transmission to a position in which it engages the idler 82 for reverse drive, and three coaxial gears 83, 84, and 85 mounted to rotate as a unit, mounted on a countershaft 86 at one side of the driving gear 77. A bevel gear 87 mounted on the sleeve 66a of the driven transmission member 79 meshes with another bevel gear 88 on the propeller shaft 66. Suitable anti-friction bearings may be provided, as indicated at 89. The gears are so designed that an overdrive of the gear 80 with respect to the gear 77 will be effected when the gears 84 and 83 are in mesh with them, respectively.

With this construction, in starting up, the clutch 69 is positioned to connect the pump rotor 70 with the driving clutch member 73 and the clutch 72 is positioned to disconnect the drive shaft 65 from the clutch drum 90 of the driven member 66a of the transmission. The sliding gear 80 is positioned as shown in the drawings to effect a drive from the driving gear 77 through the countershaft gears 83 and 84 to the gear 80 which has a one-way clutch connection 81 with the sleeve 66a on which the bevel gear 87 is mounted. With this arrangement of parts, the drive will be through the fluid torque converter and sliding gear transmission in series, an overdrive being effected between the turbine rotor 75 and the bevel gear 87 by means of the overdrive construction of the sliding gear transmission. When the speed of the bevel gear 87 has been brought up to approximately that of the drive shaft 65, the clutch 69 is released to disconnect the pump rotor 70 from the driving member 73 of the clutch and the clutch mechanism 72 is operated to connect the bevel gear 87 direct with the drive shaft 65. Under these conditions, the hydraulic torque converter parts and the sliding gear transmission parts cease to rotate, the drive being direct from the drive shaft 65 through the clutch 72 to the bevel gear 87. If desired, suitable speed controlled means similar to those described in connection with Fig. 3 may be provided to effect the shift from overdrive and torque converter action to nonoverdrive and nontorque converter action.

In Figs. 5, 6, and 7 are shown curves characteristic of the apparatus of Figs. 1 and 3. In addition, Fig. 6 shows characteristic curves of a motor whose crankshaft may be direct-connected with the drive shafts of Figs. 1 and 3.

Referring first to Fig. 5, the vertical axis represents the torque ratio between the motor shaft and propeller shaft. The horizontal axis represents the speed ratio between the propeller shaft and motor shaft. The curve marked "torque" shows how the propeller torque varies with the speed ratio. The curve marked "eff" shows how the efficiency varies with the speed ratio. Those parts of the curve corresponding to torque converter action and coupling action are indicated by brackets.

Fig. 7 shows curves characteristic of the transmission of Fig. 1. The left-hand vertical axis represents the torque ratio between the pump torque $T'$ and turbine torque $T^2$. The horizontal axis represents the speed ratio of the turbine with respect to the pump. The right-hand vertical axis represents the efficiency of the torque converter. The line $T'$ represents pump torque, which is taken as constant. The curve $T^2$ represents turbine torque. The curve $Tg$ represents reverse torque on the stator. From the laws of torque converters, the equation for $Tg$ is $Tg = T^2 - T'$. It is obvious from an inspection of Fig. 1 that pump torque $T'$ equals ring torque. Assume that in Fig. 1 the ring diameter equals twice the sun diameter. Then the sun torque ($Ts$) equals one-half the ring torque, or $\frac{1}{2} T'$. The line $Ts$ in Fig. 6 indicates sun torque. The point P where line $Ts$ intersects the curve $Tg$ is the point of change from converter to coupler action, since at this point the forward torque on the sun gear just equals the hydraulic reaction $Tg$. The point $P^2$ on the efficiency curve indicates the point in the efficiency curve at which the change from converter action to coupler action takes place. Under the laws relating to fluid torque converters, the point $P'$ indicates approximately the point on the efficiency curve where the change from converter to coupler action would take place automatically if the sun gear were not connected to exert torque on the stator. It will be noted that P² is at a much higher point on the efficiency curve than P'.

In Fig. 6 are shown curves characteristic of the torque converter of Figs. 1 and 3 when driven from a motor having certain characteristic curves. In Fig. 6 the left-hand vertical axis represents motor torque. The horizontal axis represents motor speed and the right-hand vertical axis represents motor power. The curve A represents maximum motor torque at different speeds. The curve B represents maximum ring torque at different speeds. With the planetary gear construction shown, the maximum ring torque is about two-thirds the maximum motor torque. The curve C is a typical pump drag curve if the pump is rotating at motor speed. The curve D is a pump drag curve corresponding to motor speed if the pump is rotating with ring gear speed. The curve D is derived from the curve C by calculating what motor speed would give the curve C if the pump were connected to rotate with the ring gear. For example, if the planetary design is such that cage speed equals two-thirds ring speed, the motor speeds corresponding to the same drag in curves C and D will be in the ratio of 3:2. The curve E represents the power of the motor corresponding to the torque and speed. The curve F represents the power corresponding to the drag curve C. The curve G represents the power corresponding to the drag curve D. The curve F is obtained from the equation $F = E \times C/A$. The curve G is derived from the equation $G = E \times D/A$. The basis for both of the above equations is that power transmitted with a given drag will be proportional to the power transmitted with maximum torque. A study of the above curves shows that the initial drag pick-up and hence the torque is much greater when the pump rotates with the ring overdrive than when it rotates at motor speed. An even greater difference appears in the corresponding power curves, since the power is a function of speed as well as torque.

The construction shown in Fig. 8 comprises a planetary gear transmission and a hydraulic torque converter in series with the planetary in front of the torque converter. The construction is such that at lower speeds and superdrive the planetary action is eliminated. The construction shown comprises a drive shaft 90 which may be connected with the crankshaft of an internal combustion engine, a driven shaft 91 which may be connected with the propeller shaft of an automobile, a ring gear 92 keyed to the drive shaft 90, a cage or gear carrier 93 secured to the pump rotor 94, a sun gear 95 having a tubular shaft through which the drive shaft 90 extends, planetary gearing 96 carried by the gear carrier and meshing with the sun gear 95 and ring gear 92, a turbine rotor 97 secured to the driven shaft 91, a one-way stator 98 having a tubular shaft 99 through which the driven shaft 91 extends, a one-way anchor 100 for preventing reverse rotation of the stator 98, a one-way anchor 101 for preventing reverse rotation of the sun gear 95, a clutch 102 for connecting and disconnecting the sun gear 95 with respect to the drive shaft 90, and control means for this clutch. A centrifugal clutch 103 may be provided between the driven shaft 91 and the gear carrier 93 whereby when the driven shaft reaches a predetermined speed it may be connected directly with the gear carrier.

The control mechanism for the clutch shown comprises a clutch lever 104 pivoted at 105 for slipping the clutch disc back and forth on its splined connection with the sun gear 95, electromagnetic means 106 for operating this lever 104, and circuit controlling means for the electromagnet. The circuit controlling means may be similar to the circuit controller means shown in Fig. 3 comprising a pair of speedometer pointers 107 and 108, one controlled by the speed of the drive shaft and the other controlled by the speed of the driven shaft and so arranged that when a predetermined ratio between the driven shaft and the drive shaft is reached contact will be made by the speedometer pointers. A manually operated circuit make-and-break device 109 may be placed in series with the automatic make-and-break device.

In operation, for low speeds, the electromagnetic lever operating means 106 are deenergized and the spring 110 acts to connect the sun gear with the driven shaft. Under these conditions the gear carrier 93 rotates as a unit with the drive shaft 90 and consequently the pump rotor 94 rotates with the drive shaft. Under these conditions a pure hydraulic drive is effected between the drive shaft 90 and driven shaft 91 through the pump 94, stator 98, and turbine 97. When the driven shaft 91 picks up in speed and reaches a predetermined speed ratio with respect to the drive shaft 90, the speedometer pointers 107 and 108 close the circuit to the electromagnetic means, releasing the sun gear from connection with the drive shaft 106. The sun gear 95 then falls back on the one-way anchorage means 101 so that thereafter the gear carrier 93 is driven at a lower speed than the ring gear 92. The design of the speedometers 107 and 103 may be such that the speed ratio between the drive shaft 90 and driven shaft 91, at which the shift takes place, is about 4:3 so that the fluid torque converter will cease to have torque converting action and will act as a fluid coupler after the shift, thus providing an underdrive planetary in series with a hydraulic coupler for city driving. For country driving, the manual switch 109 may be opened, deenergizing the electromagnet 106 and allowing the compression spring 110 to operate the clutch 102 to connect the sun gear 95 with the drive shaft 90. Under these conditions, furthermore, the speed of the propeller shaft should be such that the centrifugal clutch 103 can operate to connect the propeller shaft 91 with the cage 93. Under these conditions a direct drive is effected.

It will be seen that the transmission discloses apparatus operating on a high efficiency part of the hydraulic torque converter curve, that there is a quick pick-up of the pump drag, and that maximum motor torque is brought into play at a relatively low motor speed.

Further modifications will be apparent to those skilled in the art and it is desired, therefore, that the invention be limited only by the prior art and the scope of the appended claims.

Having thus described my invention, what I claim and desire to secure by Letters Patent is:

1. A variable speed transmission comprising a hydraulic torque converter, a planetary gear construction, and a rotatable drive member, said torque converter comprising a pump rotor, a turbine rotor, a reactance stato-rotor, and means, including a one-way anchorage, for preventing reverse rotation of said stato-rotor, said gear construction comprising a sun gear, a ring gear, a gear carrier and planetary gearing carried by said carrier and meshing with said ring gear and sun gear, means connecting said gear carrier to rotate in unison with said drive member, means connecting said pump rotor to rotate with the ring gear and means connecting said sun gear in force-transmitting relation to the statorotor to urge it to rotate in the same direction as the pump rotor.

2. A variable speed transmission for transmitting power from a drive shaft to a driven shaft comprising a two-stage positive transmission, one stage having a higher speed transmitting ratio than the other, a hydraulic torque converter comprising a pump rotor, a turbine rotor, and a vaned reactance rotor, instrumentalities for rendering effective the high speed stage of the positive transmission and connecting said transmission in series with the torque converter for lower overall speed transmitting ratios and instrumentalities for eliminating the torque converter action, rendering ineffective the high speed stage of the positive transmission and rendering effective the low speed stage of the positive transmission for higher over-all speed transmitting ratios, said hydraulic torque converter being driven by the positive transmission for lower overall speed transmitting ratios, and said two-stage transmission comprising an epicyclic transmission including a sun gear, a ring gear, a gear carrier and planet gearing carried by said carrier, means connecting said pump rotor to rotate in unison with said ring gear and said gear carrier being rotatable with said drive shaft, and one-way anchorage means for preventing reverse rotation of said reactance rotor, said sun gear being connected with said reactance rotor.

3. A variable speed transmission for transmitting power from a drive shaf to a driven shaft comprising a two-stage positive transmission, one stage having a higher speed transmitting ratio than the other, a hydraulic torque converter comprising a pump rotor, a turbine rotor, and a vaned reactance member, instrumentalities for rendering effective the high speed stage of the positive transmission and connecting said transmission in series with the torque converter for lower over-all speed transmitting ratios, instrumentalities for eliminating the torque converter action, rendering ineffective the high speed stage of the positive transmission and rendering effective the low speed stage of the positive transmission for higher over-all speed transmitting ratios, said hydraulic torque converter being driven by the positive transmission for lower overall speed transmitting ratios, and said two-stage transmission comprising an epicyclic transmission including a sun gear, a ring gear, a gear carrier and planet gearing carried by said carrier, means connecting said pump rotor to rotate in unison with said ring gear and said gear carrier being rotatable with said drive shaft, and a one-way clutch connecting said sun gear with said reactance rotor.

4. A variable speed transmission for transmitting power from a drive shaft to a driven shaft comprising a two-stage positive transmission, one stage having a higher speed transmitting ratio than the other, a hydraulic torque converter comprising a pump rotor, a turbine rotor, and a vaned reactance member, instrumentalities for rendering effective the high speed stage of the positive transmission and connecting said transmission in series with the torque converter for lower over-all speed transmitting ratios and instrumentalities for eliminating the torque converter action, rendering ineffective the high speed stage of the positive transmission and rendering effective the low speed stage of the positive transmission for higher over-all speed transmitting ratios, said hydraulic torque converter being driven by the positive transmission for lower overall speed transmitting ratios, and said two-stage transmission comprising an epicyclic transmission including a sun gear, a ring gear, a gear carrier and planet gearing carried by said carrier, means connecting said pump rotor to rotate in unison with said ring gear and said gear carrier connected to rotate in unison with said drive shaft, one-way clutch means for preventing the sun gear from overrunning the drive shaft, and means for holding the sun gear against rotation.

5. A turbo planetary transmission comprising a pump rotor, a turbine rotor, a turbo stator, one-way anchorage means for holding said turbo stator against reverse rotation, a sun gear connected to rotate in unison with said one-way turbo stator, a ring gear connected to rotate in unison with said pump rotor, a gear carrier, a drive shaft connected to rotate in unison with said gear carrier, planetary gearing carried by said gear carrier and meshing with said sun gear and ring gear, and a driven shaft connected to rotate in unison with said turbine rotor.

WILLARD L. POLLARD.

CERTIFICATE OF CORRECTION.

Patent No. 2,325,876. August 3, 1943.

WILLARD L. POLLARD.

It is hereby certified that error appears in the printed specification of the above numbered patent requiring correction as follows: Page 5, second column, line 36, claim 4, before the word "connected" insert --being--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.